US010057835B1

(12) United States Patent
Nehme Antoun et al.

(10) Patent No.: US 10,057,835 B1
(45) Date of Patent: Aug. 21, 2018

(54) MICRO CELL MANAGEMENT SYSTEM AND METHOD (71) Applicant: Sprint Communications Company L.P., Overland Park, KS (US)

(72) Inventors: Nicolas A. Nehme Antoun, Olathe, KS (US); Ryan S. Talley, Overland Park, KS (US); Shilpa Kowdley Srinivas, Brambleton, VA (US); Muralidhar Reddy Malreddy, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 345 days.

(21) Appl. No.: 14/179,243

(22) Filed: Feb. 12, 2014

(51) Int. Cl.
*H04W 40/12* (2009.01)
*H04W 24/02* (2009.01)

(52) U.S. Cl.
CPC ........... *H04W 40/12* (2013.01); *H04W 24/02* (2013.01)

(58) Field of Classification Search
CPC ... H04W 56/001; H04W 24/04; H04W 48/08; H04W 88/08; H04W 88/16; H04W 8/005; H04W 16/14; H04W 16/26; H04W 48/20; H04W 56/0015; H04W 84/045
USPC ........ 370/328, 329, 331, 336, 350; 375/257, 375/354; 455/450, 445; 709/224
See application file for complete search history.

(56) References Cited

U.S. PATENT DOCUMENTS

| 2010/0041411 A1* | 2/2010 | Mallik | H04W 88/08 455/450 |
| 2012/0135766 A1* | 5/2012 | Garavaglia | H04B 7/024 455/509 |
| 2013/0122917 A1* | 5/2013 | Yavuz | H04J 3/0638 455/450 |
| 2014/0078976 A1* | 3/2014 | Novak | H04W 24/02 370/329 |
| 2015/0173011 A1* | 6/2015 | Das | H04W 84/045 370/328 |
| 2015/0215879 A1* | 7/2015 | Zhu | H04W 56/001 370/350 |

OTHER PUBLICATIONS

U.S. Appl. No. 13/742,873, filed Jan. 16, 2013.
U.S. Appl. No. 13/868,642, filed Apr. 23, 2013.
U.S. Appl. No. 13/919,681, filed Jun. 17, 2013.

* cited by examiner

Primary Examiner — Marsha D. Banks Harold
Assistant Examiner — Natasha W Cosme (57) ABSTRACT A micro cell management system and method are provided. The micro cell management system in one example includes a communication interface configured to exchange communications with one or more wireless micro cells and a processing system coupled to the communication interface. The processing system is configured to obtain GPS information for each wireless micro cell of a micro cell cluster, obtain backhaul information for each wireless micro cell of the micro cell cluster, select a master cell for the micro cell cluster, with the master cell comprising a wireless micro cell having one or both of an optimum GPS signal or an optimum backhaul signal, and configure the master cell to perform one or more of relaying GPS data to other wireless micro cells of the micro cell cluster or exchanging backhaul data for the micro cell cluster.

17 Claims, 8 Drawing Sheets

MICRO CELL MANAGEMENT SYSTEM AND METHOD

TECHNICAL BACKGROUND

Wireless communication networks offer large areas of coverage. However, in some locations the wireless reception may be sporadic or unreliable. One solution has been the deployment of wireless micro cells. Wireless micro cells comprise low-power wireless transceivers that generate small coverage areas. A micro cell can provide improved local wireless communication performance.

Wireless micro cells are designed to be placed in homes, offices, and other locations in order to provide wireless communication subscribers with better and more comprehensive wireless coverage. A wireless micro cell can be deployed in locations where a regular (or macro) wireless cell offers only weak or limited coverage.

A drawback of a wireless micro cell is that an effective coverage area can be smaller than needed. As a result, a person or institution can obtain and deploy multiple wireless micro cells. The multiple wireless micro cells can be deployed in close proximity of each other, in a cluster. Such a cluster supports soft hand-offs among the wireless micro cells. A cluster can be used to maximize coverage and limit interference between wireless micro cells. However, the individual wireless cells of a cluster can be deployed and/or configured in ways that minimize communication benefits of the wireless micro cells. As a consequence, the wireless micro cells can experience varying GPS and backhaul conditions that render the cluster setup non-optimal.

OVERVIEW

A micro cell management system and method are provided. The micro cell management system in one example includes a communication interface configured to exchange communications with one or more wireless micro cells and a processing system coupled to the communication interface. The processing system is configured to obtain GPS information for each wireless micro cell of a micro cell cluster, obtain backhaul information for each wireless micro cell of the micro cell cluster, select a master cell for the micro cell cluster, with the master cell comprising a wireless micro cell having one or both of an optimum GPS signal or an optimum backhaul signal, and configure the master cell to perform one or more of relaying GPS data to other wireless micro cells of the micro cell cluster or exchanging backhaul data for the micro cell cluster.

DETAILED DESCRIPTION

Figure 1:
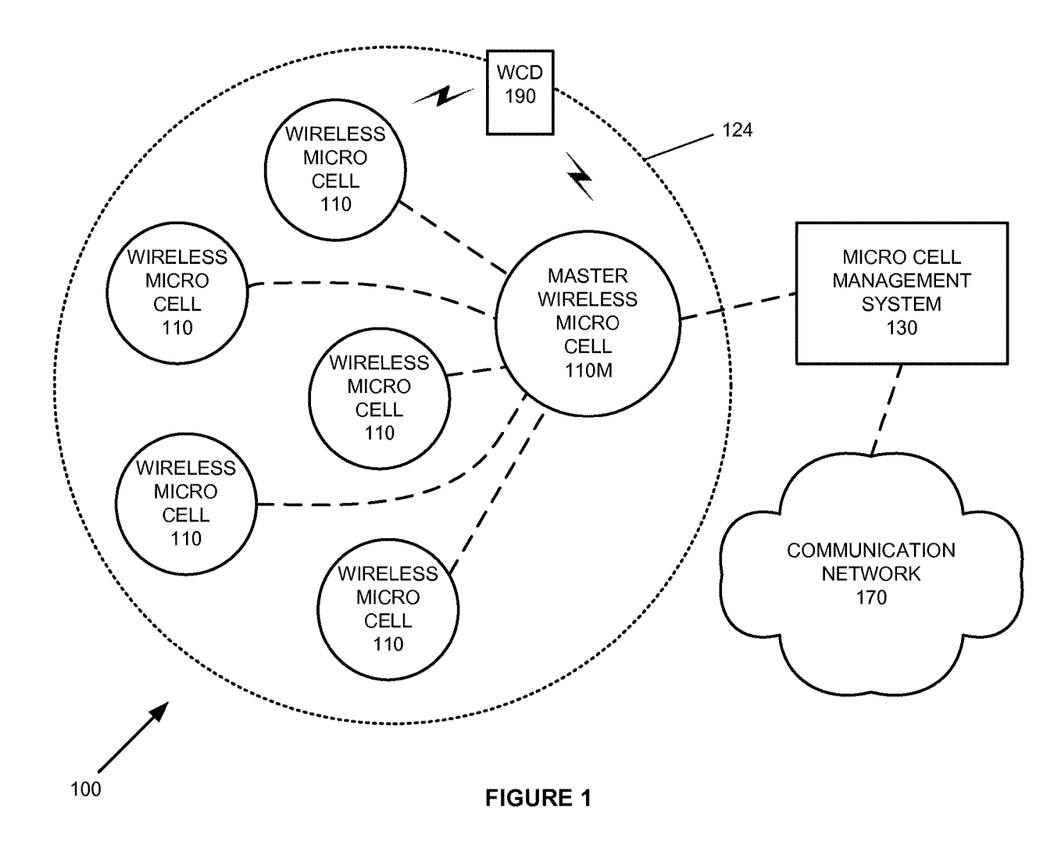
FIG. 1 shows an exemplary micro cell management system in one example.

FIG. 1 shows a wireless communication system 100 including a micro cell cluster 124 coupled to a micro cell management system 130 in one example. In addition, the micro cell management system 130 is coupled to a communication network 170.

The micro cell cluster 124 comprises a cluster of multiple wireless micro cells 110 that are clustered within a predetermined region. The multiple wireless micro cells 110 can be clustered according to a predetermined geographic region. The multiple wireless micro cells 110 can be clustered according to a predetermined user or owner and according to a predetermined geographic region. The coverage areas generated by the multiple wireless micro cells 110 can be adjacent, contiguous, or over-lapping.

A wireless micro cell 110 in some examples comprises a smaller and lower-powered version of a wireless base station or other wireless cell transceiver. The wireless micro cell 110 comprises a small wireless transceiver configured to generate a small coverage area. In some examples, a wireless micro cell may be restricted by specific criteria, including one or more of being restricted to less than 20 watts of transmission power, less than 20 simultaneous users, less than a 200 foot radius coverage footprint, and/or some other industry limitation on size. A wireless micro cell 110 is also referred to as a small cell, a femto cell, or a pico cell in some examples.

A wireless micro cell 110 can be deployed by an individual, business, institution, or service provider, for example. A wireless micro cell 110 can provide improved communication coverage and improved communication performance. The wireless micro cell 110 can be used to provide a more reliable wireless access for a wireless communication device (WCD) 190 when the WCD 190 is within a coverage area of the wireless micro cell 110 (or the micro cell cluster 124), for example.

An individual, business, institution, or service provider may deploy multiple wireless micro cells 110 that are clustered within a region. The multiple wireless micro cells 110 can be deployed in a cluster in order to create a larger wireless coverage area. The resulting micro cell cluster 124 requires coordination for the individual wireless micro cells 110 to work together and not interfere with each other, yet cooperate to exchange communications both within and without the micro cell cluster 124.

In order for the wireless micro cells 110 of the micro cell cluster 124 to provide communications outside the micro cell cluster 124, the micro cell cluster 124 is coupled to the communication network 170 via the micro cell management system 130. The multiple wireless micro cells 110 may have wired (e.g., Ethernet) or wireless (e.g., WiFi) connections with the micro cell management system 130, and may therefore have connectivity with the Internet and other voice or data networks. The micro cell management system 130 can exchange voice and data communications between the micro cell cluster 124 and the communication network 170. In addition, the micro cell management system 130 can exchange backhaul communications between the micro cell cluster 124 and the communication network 170. Backhaul signaling comprises wireless system messages that are exchanged between the wireless micro cells 110 and the micro cell management system 130 (and optionally with the communication network 170 or with additional facilities or devices that are coupled to the communication network 170). Backhaul signaling may be used to update system capabilities, update system information, or update user/subscriber information, for example.

The micro cell management system 130 relays communications to the communication network 170. In addition, the micro cell management system 130 regulates operations of the micro cell cluster 124, including registering WCDs that are newly arrived or activated within the micro cell cluster 124, monitoring the operations of the WCDs operating within the micro cell cluster 124, performing hand-offs of WCDs between wireless micro cells 110 of the micro cell cluster 124, and performing hand-offs of WCDs that are arriving in or departing from the micro cell cluster 124, for example.

The micro cell management system 130 can interface with and control multiple wireless micro cells 110. The micro cell management system 130 may receive requests from various wireless micro cells 110 for configuration data, and those requests may include, among other values, indications of the micro cells' respective locations. The micro cell management system 130 may also select various operational parameters for the micro cells (such as a carrier, a PN offset, whether to broadcast a pilot beacon, contents of any pilot beacons to be broadcast, transmission power level), and to transmit those parameters to the wireless micro cells 110, including along with other configuration data and messaging.

In order to facilitate communications within the micro cell cluster 124 and reduce or prevent interference between the plurality of wireless micro cells 110, the micro cell management system 130 may select a master cell 110M for the micro cell cluster 124. The master cell 110M in some examples receives commands from the micro cell management system 130 and relays at least some of the commands to the other wireless micro cells 110, relays GPS information to the other wireless micro cells 110, and exchanges backhaul communications for the other wireless micro cells 110. However, it should be understood that additional or other functions can be performed by the master cell 110M, and the above description is not exhaustive.

In some examples, the micro cell management system 130 dynamically updates a selection of the master cell 110M. As a result, the micro cell management system 130 can select the master cell 110M based on the best backhaul and GPS conditions and can leverage those conditions to deliver the best user communication experience.

Figure 2:
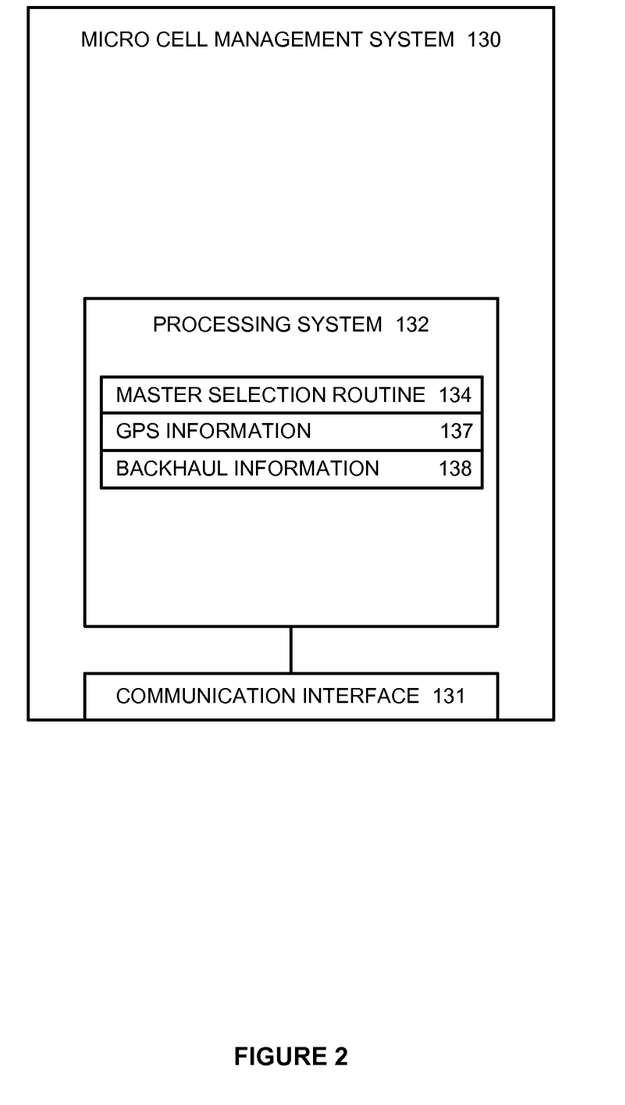
FIG. 2 shows detail of the exemplary micro cell management system in one example.

FIG. 2 shows detail of the exemplary micro cell management system 130 in one example. The micro cell management system 130 includes a communication interface 131 and a processing system 132 coupled to the communication interface 131, among other components. The communication interface 131 is configured to exchange communications between the micro cell management system 130 and one or more wireless micro cells 110, among other things. The communication interface 131 is configured to exchange voice and/or data communications and backhaul communications with the one or more wireless micro cells 110. The communication interface 131 is also configured to exchange communications with the communication network 170, including voice and/or data communications and backhaul communications in some examples.

The processing system 132 is configured to execute software or programming that controls operation of the micro cell management system 130, along with data and values needed for operation. In the example shown, the processing system 132 includes a master selection routine 134, GPS information 137, and backhaul information 138.

The master selection routine 134 is configured to perform master wireless micro cell selection for the micro cell cluster 124 in some examples. The master selection routine 134 is configured to obtain information from multiple wireless micro cells 110 that are grouped into a micro cell cluster 124. The information can include the GPS information 137 and the backhaul information 138 in some examples. The master selection routine 134 is configured to evaluate the obtained information and select a wireless micro cell 110 to be the master cell 110M. Further, the master selection routine 134 is configured to periodically obtain and evaluate the information. The master selection routine 134 can maintain a previous master cell selection or can select a new master cell selection if conditions have changed and a current master cell is no longer optimal as the master cell 110M.

The GPS information 137 comprises GPS information obtained for each wireless micro cell 110 in the micro cell cluster 124. The GPS information 137 can comprise GPS signal strengths in some examples, wherein each wireless micro cell 100 in the micro cell cluster 124 may have a different level of GPS signal reception. Some wireless micro cells 110 may have weaker GPS signal reception if the wireless micro cell 100 is positioned where it does not obtain satisfactory GPS satellite reception.

The backhaul information 138 comprises backhaul information obtained for each wireless micro cell 110 in the micro cell cluster 124. Backhaul communications between the multiple wireless micro cells 110 and the micro cell management system 130 can be wired or wireless communications. The backhaul information 138 can comprise backhaul signal strengths in some examples, wherein each wireless micro cell 110 in the micro cell cluster 124 may have a different level of backhaul signal reception. The backhaul information 138 can comprise backhaul latencies in some examples, wherein latency values can be measured or estimated for each wireless micro cell 110. Some wireless micro cells 110 may have weaker backhaul signal reception if the wireless micro cell 110 is positioned where it does not obtain satisfactory wireless backhaul signal reception. Some wireless micro cells 110 may have greater backhaul latencies, depending on factors such as geographical location or assigned or default communication priority levels for the individual wireless micro cells 110. However, it should be understood that other or additional factors may contribute to variations in backhaul signals strengths, backhaul latencies, or other backhaul communication factors of interest.

In some examples, the master selection routine 134 when executed by the micro cell management system 130 in general or the processing system 132 in particular operates to direct the micro cell management system 130 or the processing system 132 to obtain GPS information 137 for each wireless micro cell 110 of a micro cell cluster 124, obtain backhaul information 138 for each wireless micro cell of the micro cell cluster 124, select a master cell 110M for the micro cell cluster 124, with the master cell 110M comprising a wireless micro cell having one or both of an optimum GPS information 137 or an optimum backhaul information 138, and configure the master cell 110M to perform one or more of relaying GPS data 115 to other wireless micro cells of the micro cell cluster 124 or exchanging backhaul data 116 for the micro cell cluster 124.

Figure 3:
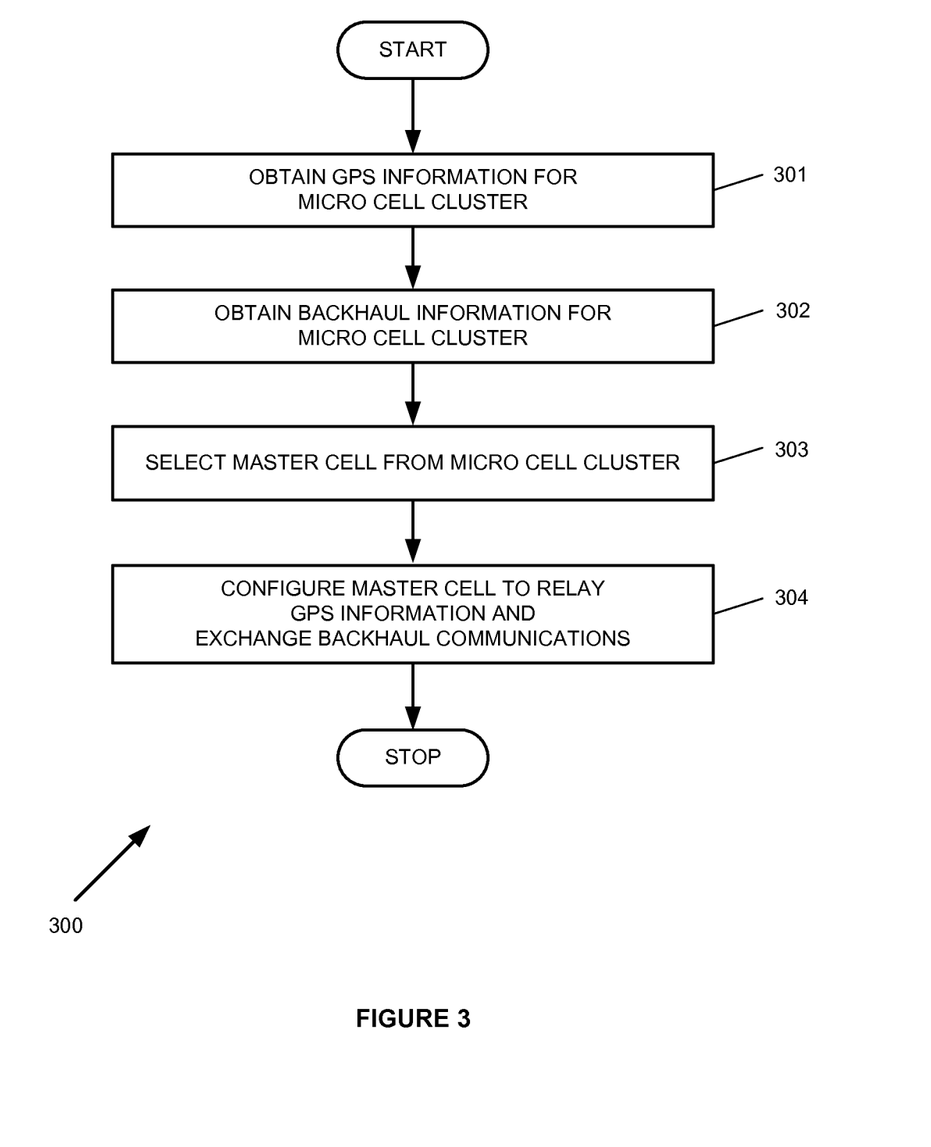
FIG. 3 is a flowchart of an exemplary micro cell management method in one example.

FIG. 3 is a flowchart 300 of an exemplary micro cell management method in one example. In step 301, a micro cell management system obtains GPS information for a micro cell cluster. The GPS information can include GPS signal strengths for each wireless micro cell. The GPS information can include GPS timing information for each wireless micro cell.

In step 302, the micro cell management system obtains backhaul information for the micro cell cluster. The backhaul information can include backhaul signal strengths for each wireless micro cell, as previously discussed. The backhaul information can include backhaul latencies for each wireless micro cell, as previously discussed. The backhaul information can include other or additional backhaul information that can be used by the micro cell management system for selecting a master cell for the micro cell cluster.

In step 303, the micro cell management system selects a master cell for the micro cell cluster. The micro cell management system selects the master cell from among the multiple wireless micro cells forming the micro cell cluster. The micro cell management system selects the master cell using the GPS information and the backhaul information.

It should be understood that the micro cell management system can use additional information in selecting the master cell, including historical information. The historical information can include information regarding previously-selected master cells. The historical information can indicate whether a particular wireless micro cell has exhibited highly variable GPS and/or backhaul performance in the past, such that a particular wireless micro cell may be passed over for selection as the master cell if the particular wireless micro cell has been repeatedly selected and de-selected in the past.

In step 304, the micro cell management system configures the selected master cell. The micro cell management system can configure the master cell to regulate communications and operations of the micro cell cluster. The micro cell management system can configure the master cell to relay GPS data to other wireless micro cells of the micro cell cluster, as the master cell will receive optimum GPS timing data, for example. As a result, the other wireless micro cells of the micro cell cluster will have GPS timing information that is identical to the GPS timing information of the master cell.

Alternatively, or in addition, the micro cell management system configures the selected master cell to exchange backhaul data for the other wireless micro cells of the micro cell cluster. Consequently, all backhaul data can be funneled through the master cell. A more efficient backhaul communications exchange may be conducted between the master cell and the micro cell management system by eliminating the multiple backhaul communications of the individual wireless micro cells.

It should be understood that the micro cell management system can configure the master cell to relay GPS data to other wireless micro cells. Alternatively, the micro cell management system can configure the master cell to exchange backhaul data for the other wireless micro cells. In yet another alternative, the micro cell management system can configure the master cell to both relay GPS data to other wireless micro cells and exchange backhaul data for the other wireless micro cells. Moreover, it should be understood that the micro cell management system can configure the master cell to perform other master cell functions, and the master cell is not limited to the functions described herein.

It should be understood that steps 301-304 above can be periodically performed by the micro cell management system. The steps 301-304 can be performed a predetermined time intervals, for example. Consequently, the micro cell management system can periodically evaluate communication conditions with the micro cell cluster and within the micro cell cluster. As a result, the micro cell management system can determine whether to maintain a current master cell or to select a new master cell, as conditions dictate. Therefore, the micro cell management system can maintain an optimal master cell over time, as conditions change.

Figure 4:
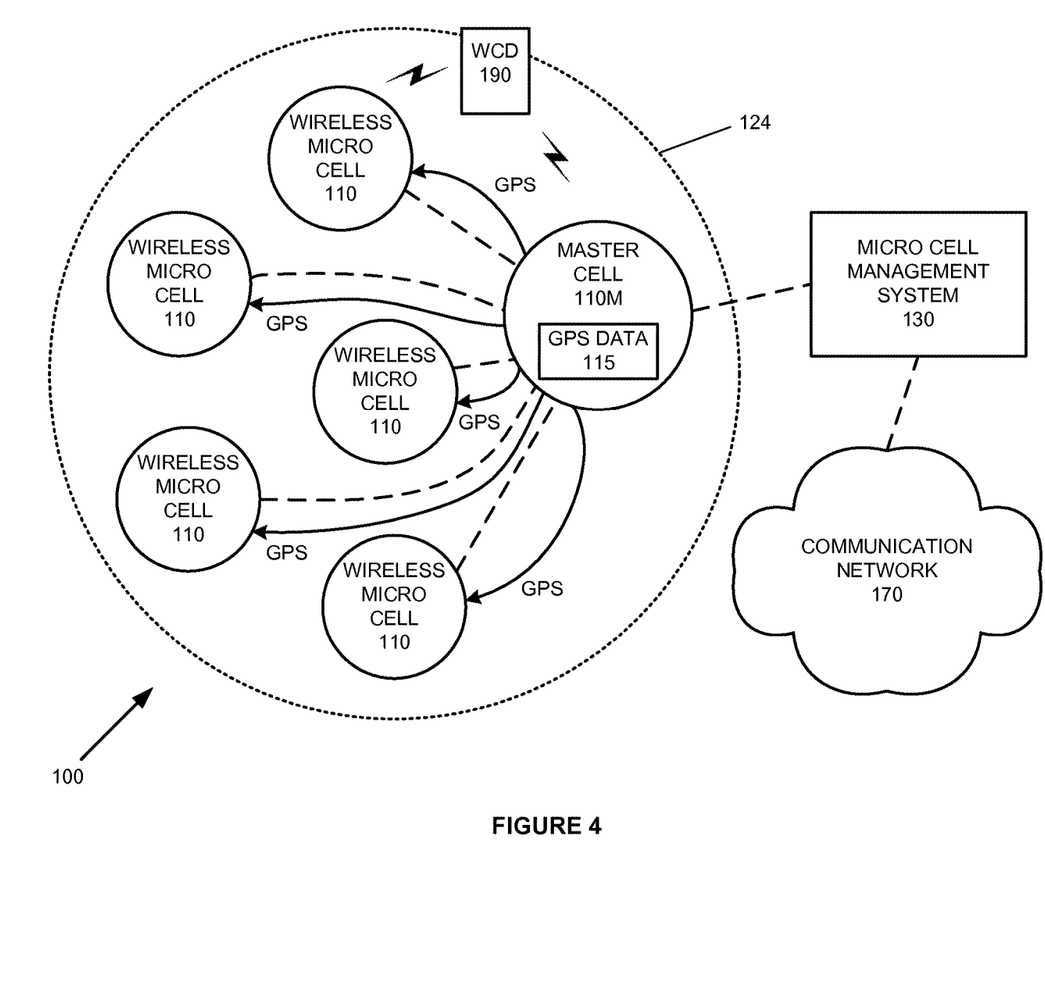
FIG. 4 shows a master cell relaying GPS data to other wireless micro cells of a micro cell cluster.

FIG. 4 shows the master cell 110M relaying GPS data 115 to other wireless micro cells 110 of the micro cell cluster 124. The master cell 110M has exhibited a best or optimal GPS signal. The master cell 110M in this example has been configured to comprise a GPS timing master, where the master cell 110M includes GPS data 115 that the master cell 110M has obtained from a satellite or satellites of the GPS system. The GPS data 115 includes GPS timing data in some examples. The master cell 110M subsequently relays the GPS data 115 to the other wireless micro cells 110 of the micro cell cluster 124. Consequently, the other wireless micro cells 110 possess GPS timing information that is identical to the GPS timing information of the master cell 110M.

Figure 5:
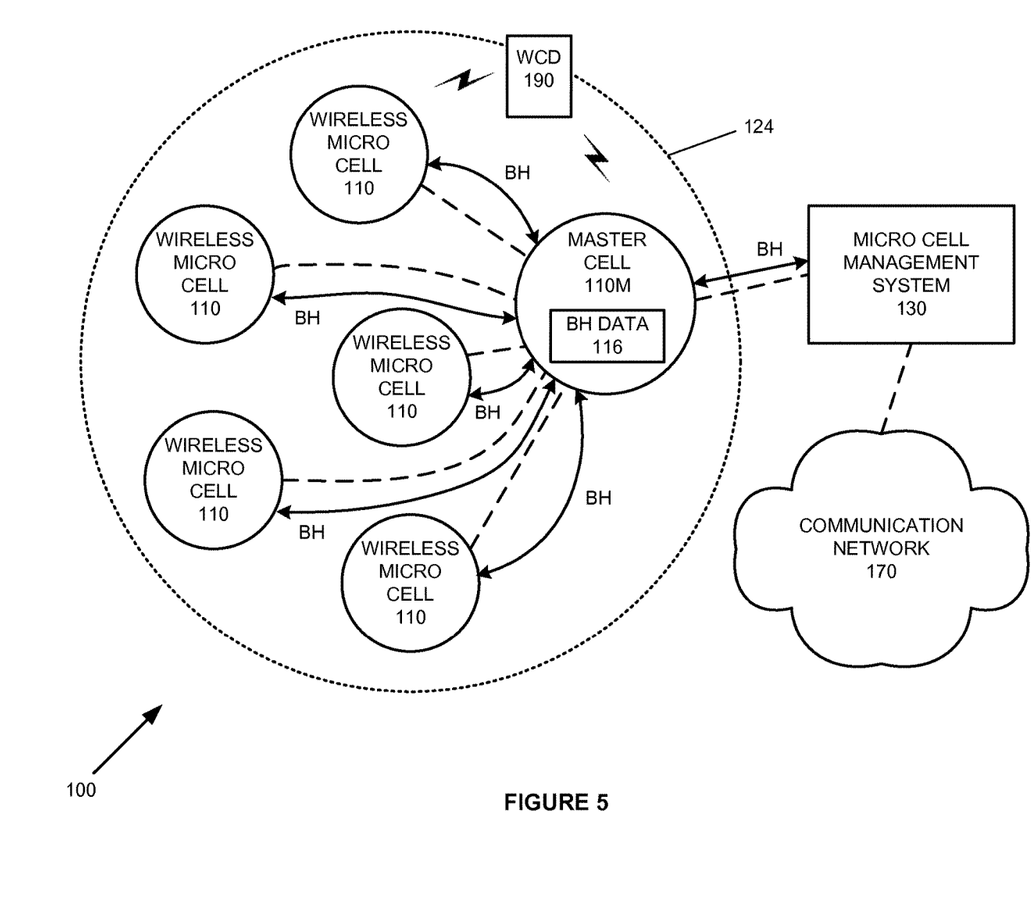
FIG. 5 shows the master cell exchanging backhaul data for the micro cell cluster.

FIG. 5 shows the master cell 110M exchanging backhaul data 116 for the micro cell cluster 124. The master cell 110M has exhibited a best or optimal backhaul communications. The master cell 110M in this example has been configured to comprise a backhaul master and exchanges backhaul communications with the micro cell management system 130 (see "BH" arrow). The master cell 110M includes backhaul data 116 that the master cell 110M exchanges between the micro cell cluster 124 and the micro cell management system 130. The master cell 110M therefore funnels backhaul communications between the micro cell cluster 124 and the micro cell management system 130 in some examples.

The backhaul data 116 in some examples comprises backhaul communications received from the micro cell management system 130. The master cell 110M receives the backhaul communications as backhaul data 116. The master cell 110M distributes the backhaul data 116 to appropriate wireless micro cells 110.

Alternatively, or in addition, the backhaul data 116 comprises backhaul communications received from the wireless micro cells 110. The master cell 110M aggregates the backhaul communications as backhaul data 116. The master cell 110M transfers the backhaul data 116 to the micro cell management system 130.

Figure 6:
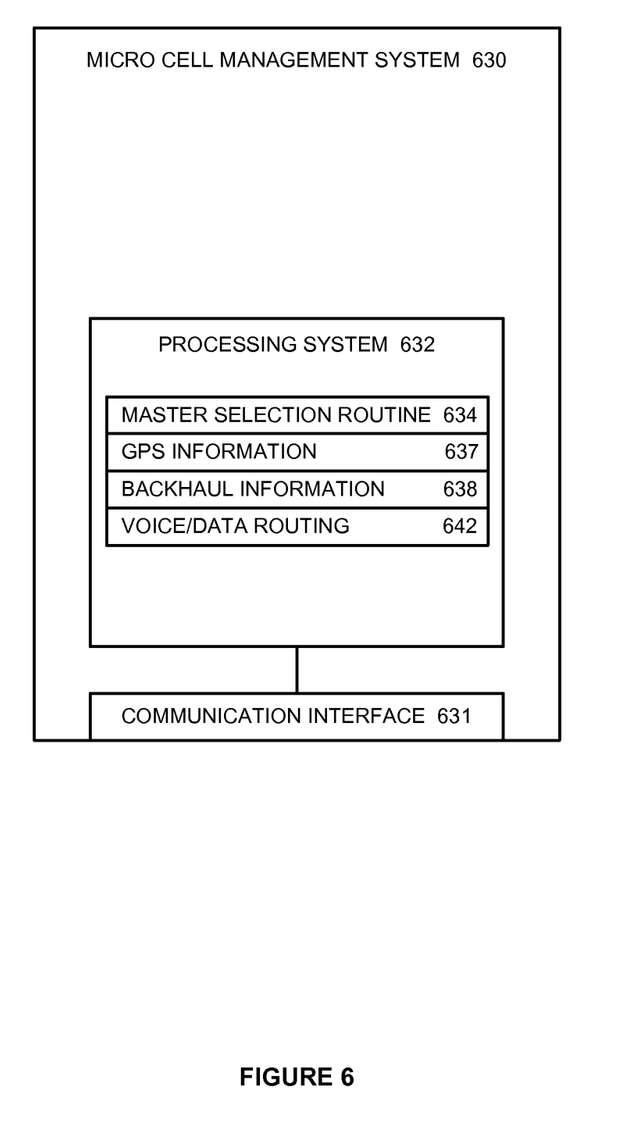
FIG. 6 shows detail of the exemplary micro cell management system in another example.

FIG. 6 shows detail of the exemplary micro cell management system 630 in another example. The micro cell management system 630 of FIG. 6 is an example of a micro cell management system 130, but may be the same as or different from the micro cell management system 130 of FIG. 1. The micro cell management system 630 includes a communication interface 631 and a processing system 632 coupled to the communication interface 631, among other components. The communication interface 631 is configured to exchange communications between the micro cell management system 630 and one or more wireless micro cells 110, among other things. The communication interface 631 is configured to exchange voice and/or data communications and backhaul communications with the one or more wireless micro cells 110. The communication interface 631 is also configured to exchange communications with the communication network 170, including voice and/or data communications and backhaul communications in some examples.

The processing system 632 is configured to execute software or programming that controls operation of the micro cell management system 630, along with data and values needed for operation. In the example shown, the processing system 632 includes a master selection routine 634, GPS information 637, backhaul information 638, and voice/data routing information 642.

The master selection routine 634 is configured to perform master wireless micro cell selection for the micro cell cluster 124 in some examples. The master selection routine 634 is configured to obtain information from multiple wireless micro cells 110 that are grouped into a micro cell cluster 124. The information can include the GPS information 637 and the backhaul information 638 in some examples. The master selection routine 634 is configured to evaluate the obtained information and select a wireless micro cell 110 to be the master cell 110M. Further, the master selection routine 634 is configured to periodically obtain and evaluate the information. The master selection routine 634 can maintain a previous master cell selection or can select a new master cell selection if conditions have changed and a current master cell is no longer optimal as the master cell 110M.

The GPS information 637 comprises GPS information obtained for each wireless micro cell 110 in the micro cell cluster 124. The GPS information 637 can comprise GPS signal strengths in some examples, wherein each wireless micro cell 100 in the micro cell cluster 124 may have a different level of GPS signal reception. Some wireless micro cells 110 may have weaker GPS signal reception if the wireless micro cell 100 is positioned where it does not obtain satisfactory GPS satellite reception.

The backhaul information 638 comprises backhaul information obtained for each wireless micro cell 110 in the micro cell cluster 124. Backhaul communications between the multiple wireless micro cells 110 and the micro cell management system 630 can be wired or wireless communications. The backhaul information 638 can comprise backhaul signal strengths in some examples, wherein each wireless micro cell 110 in the micro cell cluster 124 may have a different level of backhaul signal reception. The backhaul information 638 can comprise backhaul latencies in some examples, wherein latency values can be measured or estimated for each wireless micro cell 110. Some wireless micro cells 110 may have weaker backhaul signal reception if the wireless micro cell 110 is positioned where it does not obtain satisfactory wireless backhaul signal reception. Some wireless micro cells 110 may have greater backhaul latencies, depending on factors such as geographical location or assigned or default communication priority levels for the individual wireless micro cells 110. However, it should be understood that other or additional factors may contribute to variations in backhaul signals strengths, backhaul latencies, or other backhaul communication factors of interest.

The voice/data routing information 642 comprises routing information for use by the master cell 110M. The voice/data routing information 642 comprises information that configures the master cell 110M to route one or more of voice and data communications of the micro cell cluster 124 through backhaul communications of the master cell 110M.

In some examples, the master selection routine 634 when executed by the micro cell management system 630 in general or the processing system 632 in particular operates to direct the micro cell management system 630 or the processing system 632 to obtain GPS information 637 for each wireless micro cell 110 of a micro cell cluster 124, obtain backhaul information 638 for each wireless micro cell of the micro cell cluster 124, select a master cell 110M for the micro cell cluster 124, with the master cell 110M comprising a wireless micro cell having one or both of an optimum GPS information 637 or an optimum backhaul information 638, and configure the master cell 110M to perform one or more of relaying GPS data 115 to other wireless micro cells of the micro cell cluster 124 or exchanging backhaul data 116 for the micro cell cluster 124, and configure the master cell with the voice/data routing information 642 to route one or both of voice and data communications through backhaul communications of the master cell.

Figure 7:
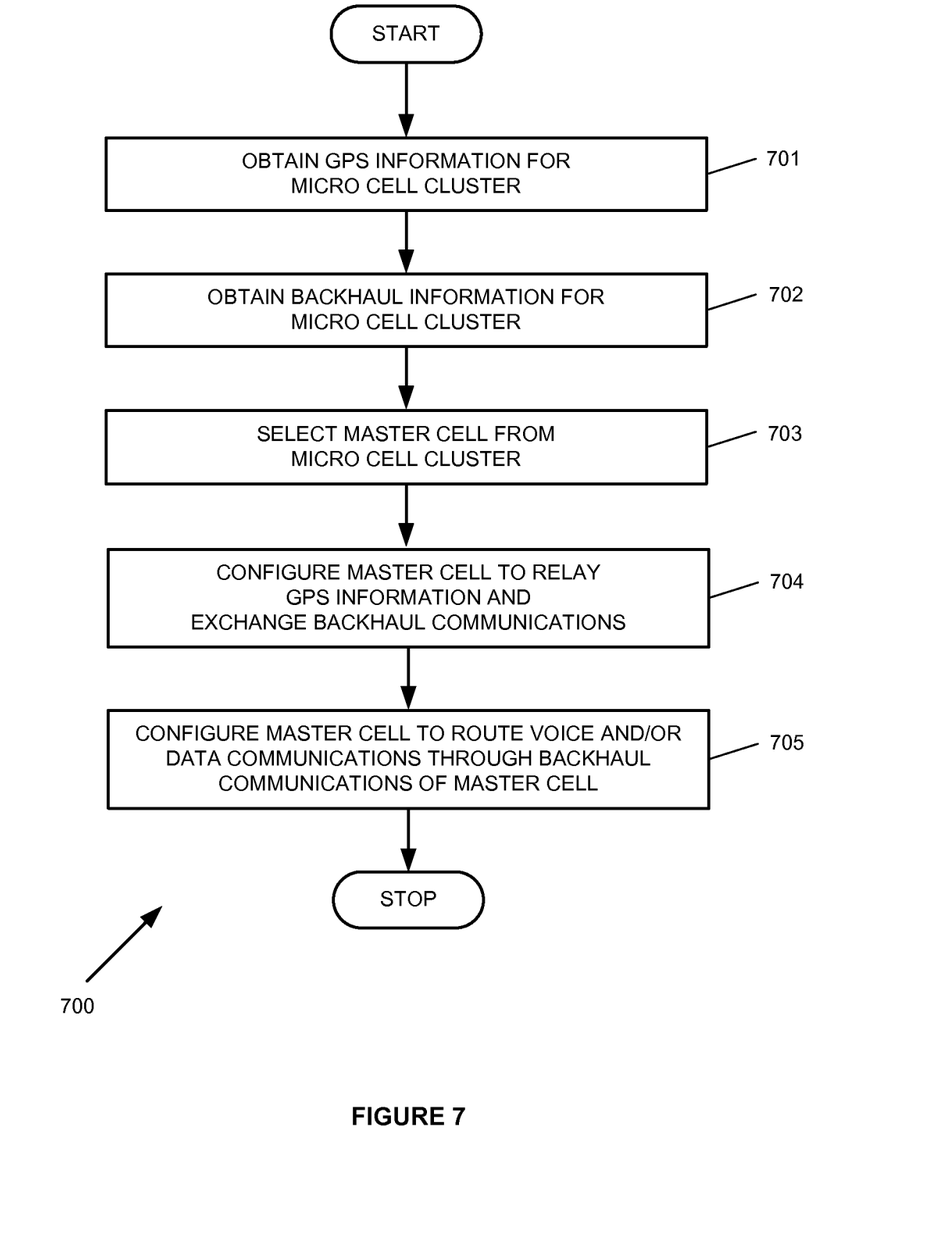
FIG. 7 is a flowchart of an exemplary micro cell management method in one example.

FIG. 7 is a flowchart 700 of an exemplary micro cell management method in one example. In step 701, a micro cell management system obtains GPS information for a micro cell cluster. The GPS information can include GPS signal strengths for each wireless micro cell. The GPS information can include GPS timing information for each wireless micro cell.

In step 702, the micro cell management system obtains backhaul information for the micro cell cluster. The backhaul information can include backhaul signal strengths for each wireless micro cell, as previously discussed. The backhaul information can include backhaul latencies for each wireless micro cell, as previously discussed. The backhaul information can include other or additional backhaul information that can be used by the micro cell management system for selecting a master cell for the micro cell cluster.

In step 703, the micro cell management system selects a master cell for the micro cell cluster. The micro cell management system selects the master cell from among the multiple wireless micro cells forming the micro cell cluster. The micro cell management system selects the master cell using the GPS information and the backhaul information.

It should be understood that the micro cell management system can use additional information in selecting the master cell, including historical information. The historical information can include information regarding previously-selected master cells. The historical information can indicate whether a particular wireless micro cell has exhibited highly variable GPS and/or backhaul performance in the past, such that a particular wireless micro cell may be passed over for selection as the master cell if the particular wireless micro cell has been repeatedly selected and de-selected in the past.

In step 704, the micro cell management system configures the selected master cell. The micro cell management system can configure the master cell to regulate communications and operations of the micro cell cluster. The micro cell management system can configure the master cell to relay GPS data to other wireless micro cells of the micro cell cluster, as the master cell will receive optimum GPS timing data, for example. As a result, the other wireless micro cells of the micro cell cluster will have GPS timing information that is identical to the GPS timing information of the master cell.

Alternatively, or in addition, the micro cell management system configures the selected master cell to exchange backhaul data for the other wireless micro cells of the micro cell cluster. Consequently, all backhaul data can be funneled through the master cell. A more efficient backhaul communications exchange may be conducted between the master cell and the micro cell management system by eliminating the multiple backhaul communications of the individual wireless micro cells.

It should be understood that the micro cell management system can configure the master cell to relay GPS data to other wireless micro cells. Alternatively, the micro cell management system can configure the master cell to exchange backhaul data for the other wireless micro cells. In yet another alternative, the micro cell management system can configure the master cell to both relay GPS data to other wireless micro cells and exchange backhaul data for the other wireless micro cells. Moreover, it should be understood that the micro cell management system can configure the master cell to perform other master cell functions, and the master cell is not limited to the functions described herein.

In step 705, the micro cell management system configures the master cell to route voice and/or data communications through the backhaul communications of the master cell. The voice and/or data communications comprise voice and data communications of the multiple wireless micro cells, including the master cell. The routing routes the communications from the master cell to the micro cell management system (and beyond) via the backhaul communications of the master cell.

It should be understood that steps 701-705 above can be periodically performed by the micro cell management system. The steps 701-704 can be performed a predetermined time intervals, for example. Consequently, the micro cell management system can periodically evaluate communication conditions with the micro cell cluster and within the micro cell cluster. As a result, the micro cell management system can determine whether to maintain a current master cell or to select a new master cell, as conditions dictate. Therefore, the micro cell management system can maintain an optimal master cell over time, as conditions change.

Figure 8:
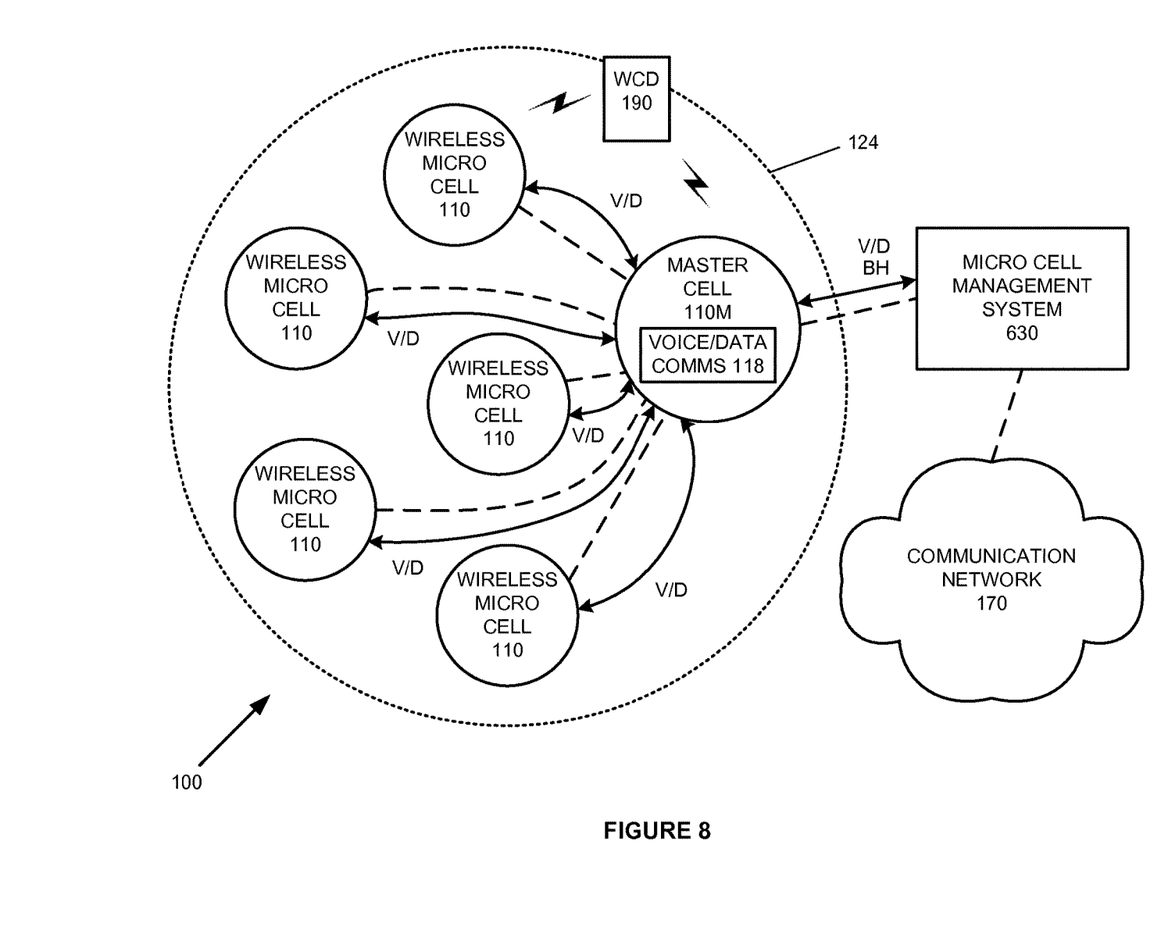
FIG. 8 shows the master cell configured to route one or both of voice and data communications through backhaul communications of the master cell.

FIG. 8 shows the master cell 110M configured to route one or both of voice and data communications through backhaul communications of the master cell 110M. The master cell 110M in this example has been configured to exchange voice communications and data communications between the micro cell cluster 124 and the micro cell management system 130 (see "V/D BH" arrow). The master cell 110M includes voice/data communications 118 that the master cell 110M exchanges between the micro cell cluster 124 and the micro cell management system 130. The master cell 110M therefore funnels voice communications and data communications between the micro cell cluster 124 and the micro cell management system 130 in some examples.

The voice/data communications 118 in some examples comprises voice and data communications received from the micro cell management system 130. The master cell 110M receives the voice and data communications as the voice/data communications 118. The master cell 110M distributes the voice/data communications 118 to appropriate wireless micro cells 110.

Alternatively, or in addition, the voice/data communications 118 comprises voice and data communications received from the wireless micro cells 110. The master cell 110M aggregates the backhaul communications as the voice/data communications 118. The master cell 110M transfers the voice/data communications 118 to the micro cell management system 130.

Referring again to FIG. 1, the wireless communication system in the examples can provide communication services including voice calls, text messages, data access, or other communication services provided over cellular or wireless communication networks. In some examples, the wireless communication system includes equipment to provide wireless access and communication services to WCDs within different coverage areas, route communications between content providers and WCDs, and facilitate handoffs between wireless micro cells, among other operations.

The wireless micro cells may be coupled together by communication links. The wireless micro cells may be further coupled to other devices or networks, including telephone landlines or Internet links, for example. As a result, communications exchanged between WCDs and the wireless micro cells may be further provided to other devices within the wireless communication system.

The wireless communication system can comprise a LTE, LTE Advanced, or Evolved Universal Terrestrial Radio Access (EUTRA) wireless access network in some examples. The wireless communication system can comprise a High Rate Packet Data (HRPD) or an evolved High Rate Packet Data (eHRPD) network, a Global System for Mobile communications (GSM) network, a Universal Mobile Telecommunications System (UMTS) network, a Code Division Multiple Access (CDMA) network, an Enhanced Voice-Data Optimized (EV-DO) network, a single-carrier radio transmission technology link (1×RTT) network, a High Speed Packet Access (HSPA) network, a Radio Link Protocol (RLP) network, a Worldwide Interoperability for Microwave Access (WiMAX) network, an Orthogonal Frequency-Division Multiple Access (OFDMA) network, a Single-carrier frequency-division multiple access (SC-FDMA) network, a Wideband Code Division Multiple Access (W-CDMA) network, a Time Division Synchronous Code Division Multiple Access (TD-SCDMA) network, an IEEE 802.11 network, a Wireless Fidelity (Wi-Fi) network, or some other cellular or wireless communication format, including combinations, improvements, or variations thereof. However, the above examples are illustrative and are not exhaustive. Other wireless communication systems are contemplated and are within the scope of the description and claims. Further, the examples above apply equally well to improvements and enhancements of current wireless communication systems.

The micro cell management system in the examples includes processing equipment, routing equipment, physical structures, and can also include transceiver equipment, antenna equipment, and other equipment. The micro cell management system includes at least one transceiver and antenna for exchanging wireless communications with WCDs in a particular sector of wireless coverage. It should be understood that the micro cell management system could be distributed or consolidated among equipment or circuitry that together forms the elements of the micro cell management system. Further equipment, networks, and systems can be communicatively coupled to the micro cell management system, such as equipment, networks, and systems of wireless voice and wireless data communication systems, but are omitted from the figures for clarity.

A WCD can comprise a mobile device, including a cellular phone, but also may include other devices. A WCD can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. A WCD may be integrated within other systems and devices, such as vehicles, appliances, apparel, and the like. A WCD can detect and report various system conditions to the wireless access node, such as inter-cell interference and failed signaling access.

A WCD in the examples receives wireless access to communication services through the wireless micro cells. The communication services can include voice calls, text messaging, data exchange, multimedia streaming, and the like. A WCD can include one or more transceiver portions for communication over one or more wireless links of differing frequency bands. A WCD can receive wireless access information from one or more wireless micro cells, such as beacon signals, channel information, frequency information, overhead signaling, neighbor lists, and the like. A WCD can move among any of the coverage areas associated with the wireless micro cells and receive wireless access.

The communication interface of the micro cell management system in the examples comprises a network card, network interface, port, or interface circuitry that allows the micro cell management system to communicate with other communication devices, including the multiple wireless micro cells. The communication interface may also include a memory device, software, processing circuitry, or some other device. The communication interface may use various communication protocols, such as time division multiplex, internet, Ethernet, wireless, or some other communication format—including combinations thereof—to exchange communications as described herein.

The processing system of the micro cell management system in the examples can comprise one or more microprocessors and other circuitry that retrieves and executes the master selection routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the master selection routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the master selection routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the master selection routine can, when loaded into the processing system and executed, transform the processing system into a special-purpose computing system configured to select a master cell in a micro cell cluster of multiple wireless micro cells, among other operations. Encoding the master selection routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the master selection routine can transform the physical state of the semiconductor memory when the program is encoded therein. For example, the master selection routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The master selection routine in the examples comprises computer programs, firmware, or some other form of machine-readable processing instructions. The master selection routine may include an operating system, utilities, drivers, network interfaces, applications, virtual machines, or some other type of software. The master selection routine can include additional processes, programs, or components, such as operating system software, database software, or application software. The master selection routine can also comprise firmware or some other form of machine-readable processing instructions executable by the processing system.

The master selection routine in the examples can include additional processes, programs, or components, such as operating system software, database software, or application software. The master selection routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A micro cell management system, comprising:
a communication interface configured to exchange communications between a micro cell cluster and a communication network, wherein the micro cell cluster comprises a plurality of wireless micro cells; and
a processing system coupled to the communication interface, with the processing system configured to obtain backhaul information comprising backhaul latencies for each of the wireless micro cells of the micro cell cluster when the micro cell management system is powered-up, select a master cell for the micro cell cluster from among the wireless micro cells of the micro cell cluster based on the backhaul latencies of the backhaul information when the micro cell management system is powered-up, configure the master cell to receive backhaul communications transmitted from other wireless micro cells of the micro cell cluster, aggregate the backhaul communications as aggregated backhaul data, and transfer the aggregated backhaul data for delivery to the micro cell management system.

2. The micro cell management system of claim 1, wherein the processing system configured to obtain the backhaul information comprises the processing system configured to obtain backhaul signal strengths from each of the wireless micro cells of the micro cell cluster.

3. The micro cell management system of claim 1, wherein the processing system configured to configure the master cell to transfer the aggregated backhaul data for delivery to the micro cell management system comprises the processing system configured to configure the master cell to transfer the aggregated backhaul data for delivery to the micro cell management system over a backhaul connection of the master cell.

4. The micro cell management system of claim 1, wherein the processing system is configured to periodically obtain updated backhaul information during operation and either maintain the master cell previously selected or select a new master cell for the micro cell cluster based on the updated backhaul information.

5. The micro cell management system of claim 1, wherein the processing system is further configured to configure one or more of the other wireless micro cells to route voice and data communications through a backhaul connection of the master cell.

6. The micro cell management system of claim 1, wherein the processing system is further configured to configure the master cell to receive a command from the micro cell management system and relay the command to the other wireless micro cells of the micro cell cluster.

7. A micro cell management system, comprising:
a communication interface configured to exchange communications between a micro cell cluster and a communication network, wherein the micro cell cluster comprises a plurality of wireless micro cells; and
a processing system coupled to the communication interface, with the processing system configured to obtain backhaul information comprising backhaul latencies for each of the wireless micro cells of the micro cell cluster when the micro cell management system is powered-up, select a master cell for the micro cell cluster from among the wireless micro cells of the micro cell cluster based on the backhaul latencies of the backhaul information when the micro cell management system is powered-up, configure the master cell to receive backhaul communications transmitted from other wireless micro cells of the micro cell cluster, aggregate the backhaul communications as aggregated backhaul data, transfer the aggregated backhaul data for delivery to the micro cell management system, and configure the master cell to route one or both of voice and data communications of the micro cell cluster through a backhaul connection of the master cell.

8. The micro cell management system of claim 7, wherein the processing system configured to obtain the backhaul information comprises the processing system configured to obtain backhaul signal strengths from each of the wireless micro cells of the micro cell cluster.

9. The micro cell management system of claim 7, wherein the processing system configured to configure the master cell to transfer the aggregated backhaul data for delivery to the micro cell management system comprises the processing system configured to configure the master cell to transfer the aggregated backhaul data for delivery to the micro cell management system over the backhaul connection of the master cell.

10. The micro cell management system of claim 7, wherein the processing system is configured to periodically obtain updated backhaul information during operation and either maintain the master cell previously selected or select a new master cell for the micro cell cluster based on the updated backhaul information.

11. The micro cell management system of claim 7, wherein the processing system is further configured to configure the master cell to receive a command from the micro cell management system and relay the command to the other wireless micro cells of the micro cell cluster.

12. A method of operating a micro cell management system to manage a micro cell cluster having a plurality of wireless micro cells, the method comprising:
in a micro cell management system, obtaining backhaul information comprising backhaul latencies for each of the wireless micro cells of the micro cell cluster when the micro cell management system is powered-up, wherein the micro cell cluster is coupled to a communication network via the micro cell management system;
in the micro cell management system, selecting a master cell for the micro cell cluster from among the wireless micro cells of the micro cell cluster based on the backhaul latencies of the backhaul information when the micro cell management system is powered-up; and
in the micro cell management system, configuring the master cell to receive backhaul communications transmitted from other wireless micro cells of the micro cell cluster, aggregating the backhaul communications as aggregated backhaul data, and transferring the aggregated backhaul data for delivery to the micro cell management system.

13. The method of claim 12, wherein obtaining the backhaul information comprises the micro cell management system obtaining backhaul signal strengths from each of the wireless micro cells of the micro cell cluster.

14. The method of claim 12, wherein configuring the master cell to transfer the aggregated backhaul data for delivery to the micro cell management system comprises the micro cell management system configuring the master cell to transfer the aggregated backhaul data for delivery to the micro cell management system over a backhaul connection of the master cell.

15. The method of claim 12, further comprising the micro cell management system periodically obtaining updated backhaul information during operation and either maintaining the master cell previously selected or selecting a new master cell for the micro cell cluster based on the updated backhaul information.

16. The method of claim 12, further comprising, in the micro cell management system, configuring the master cell to route one or both of voice communications and data communications through a backhaul connection of the master cell.

17. The method of claim 12, further comprising, in the micro cell management system, configuring the master cell to receive a command from the micro cell management system and relaying the command to the other wireless micro cells of the micro cell cluster.

* * * * *